Figure 1:
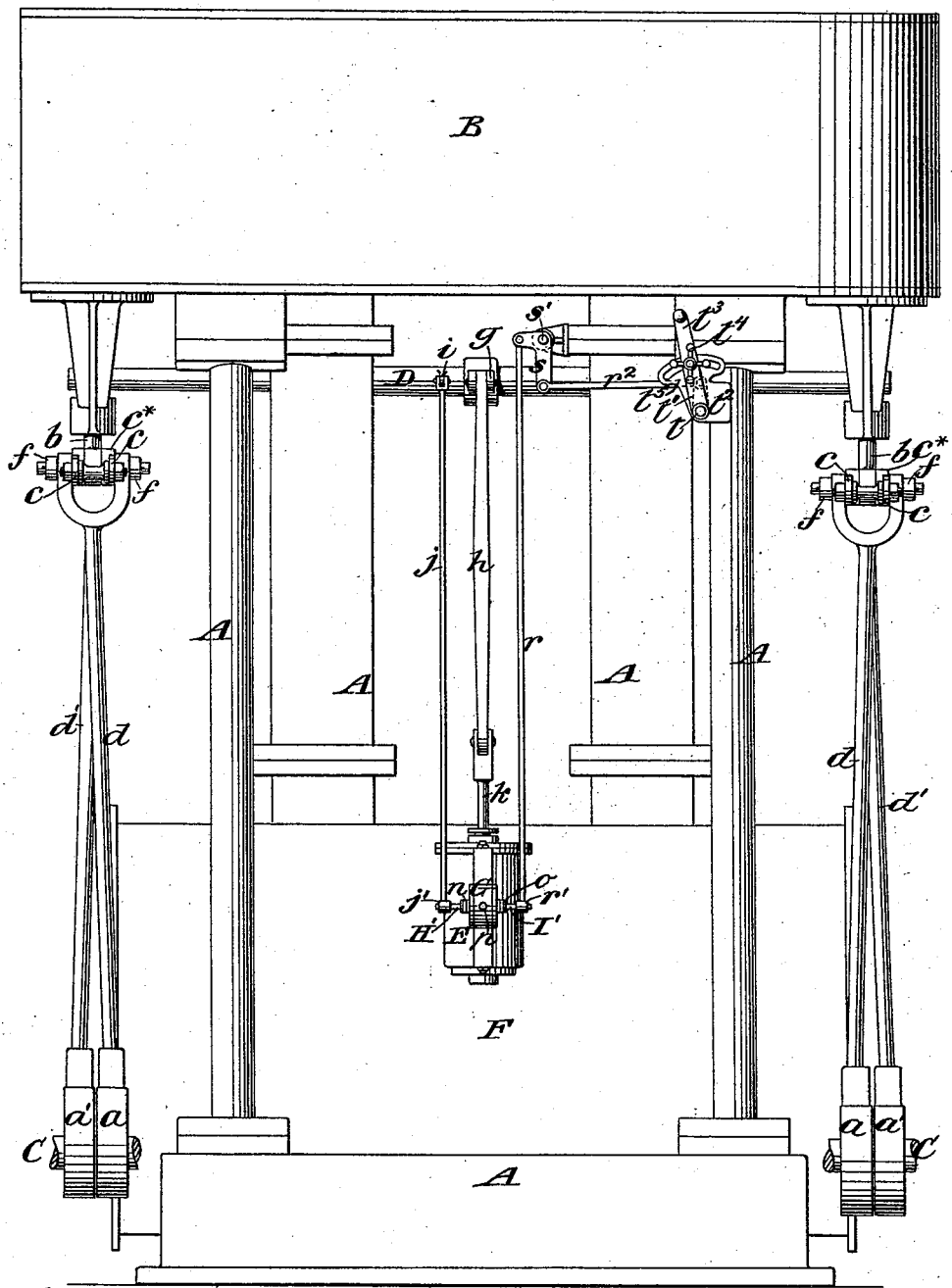

(No Model.)  A. MILLER.  3 Sheets—Sheet 1.
STEAM ENGINE.

No. 531,267.  Patented Dec. 18, 1894.

Witnesses:
O. E. Sundgren
George Barry

Inventor:
Alexander Miller
by attorneys
Brown & Seward (No Model.) 3 Sheets—Sheet 2.
A. MILLER.
STEAM ENGINE.
No. 531,267. Patented Dec. 18, 1894.
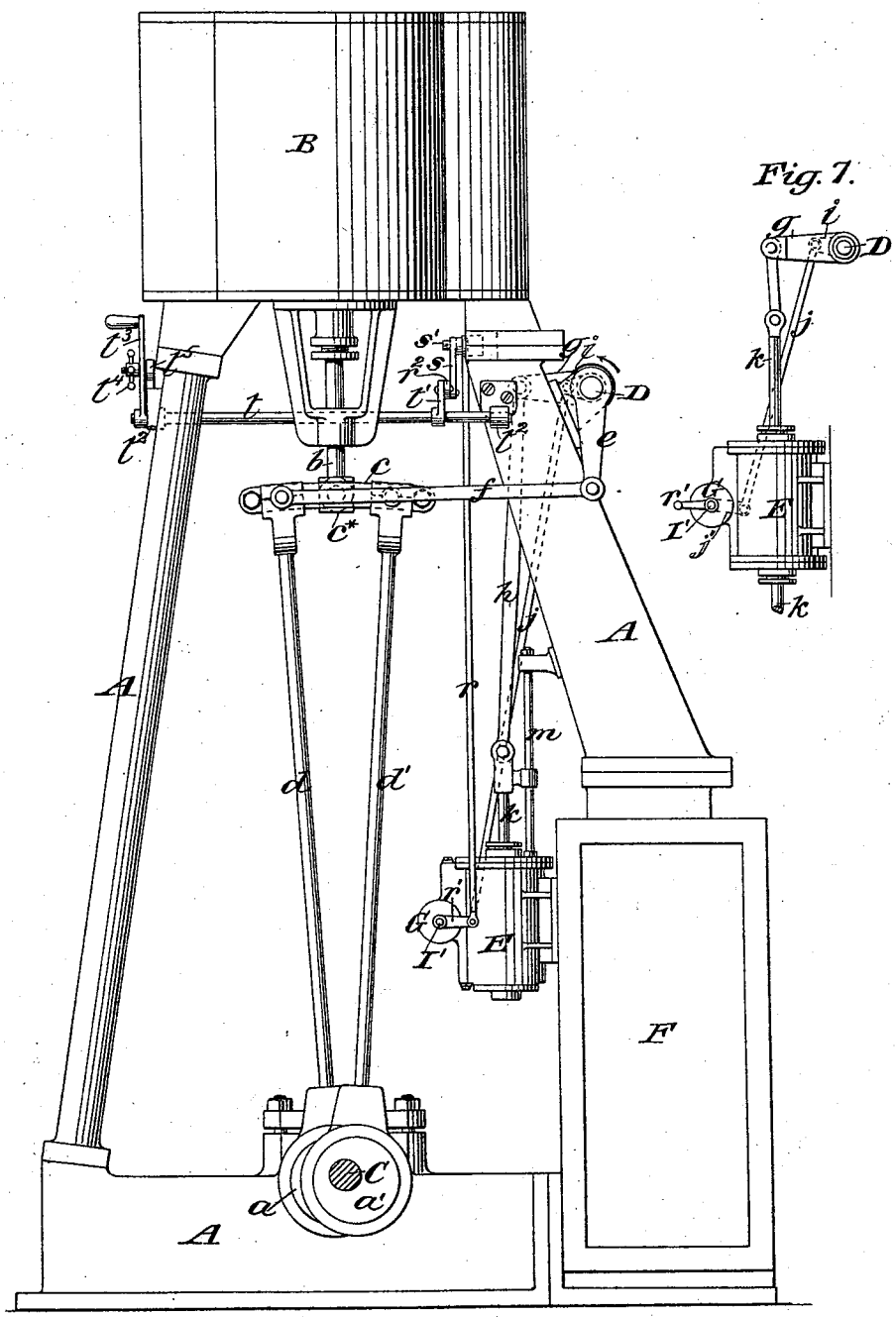
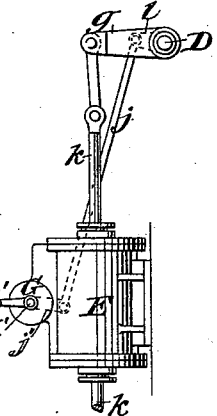
Witnesses:
C. L. Sundgren
George Barry.
Inventor:
Alexander Miller
by attorneys
Brown & Seward (No Model.) 3 Sheets—Sheet 3.
A. MILLER.
STEAM ENGINE.
No. 531,267. Patented Dec. 18, 1894.
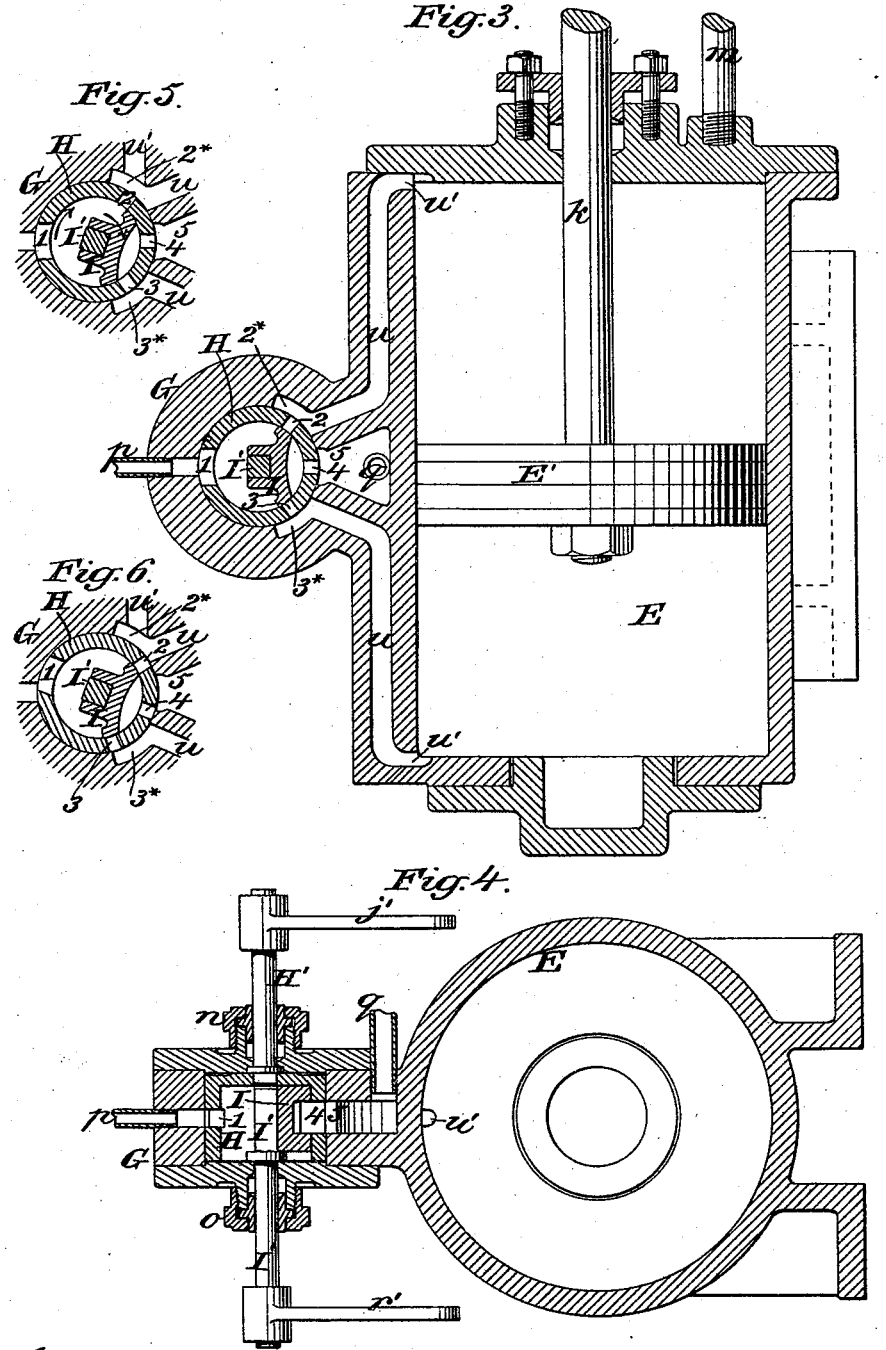
Witnesses:
C. L. Sundgren
George Barry,
Inventor:
Alexander Miller
by attorneys
Brown & Seward

UNITED STATES PATENT OFFICE.

ALEXANDER MILLER, OF NEW YORK, N. Y., ASSIGNOR TO WILLIAM BROWN, OF JERSEY CITY, NEW JERSEY, AND ALEXANDER MILLER, OF NEW YORK, N. Y.

STEAM-ENGINE.

SPECIFICATION forming part of Letters Patent No. 531,267, dated December 18, 1894.

Application filed March 8, 1894. Serial No. 502,833. (No model.)

*To all whom it may concern:*

Be it known that I, ALEXANDER MILLER, of the city and county of New York, in the State of New York, have invented a new and useful Improvement in Steam-Engines, of which the following is a specification.

My invention has for its especial object to provide a small engine suitable for controlling the operation of the valves of a larger engine or for producing the operation of any valves or valve gear which may require too much power to admit of the operation directly by hand.

An engine embodying my invention is also applicable to other purposes for which an engine the piston of which is capable of a variable stroke is desirable.

I will first describe the improvement in detail with reference to the accompanying drawings and afterward point out its novelty in the claims.

Figure 1 represents a front view of the cylinders, the valve gear and parts of the crank shaft of a double marine steam engine hereinafter referred to as the main engine to the valve gear of which a smaller engine embodying my invention is applied as a reversing engine. Fig. 2 represents a side view of the same. Fig. 3 represents a vertical section parallel with Fig. 2, of the cylinder of the reversing engine and its valves. Fig. 4 represents a horizontal section corresponding with Fig. 3. Figs. 5 and 6 represent sections of the valves and ports corresponding with Fig. 3, showing the valves in different positions. Fig. 7 is a side view of an engine embodying my invention suitable for operating directly on a valve.

Similar letters and numerals of reference designate corresponding parts in all the figures.

In Figs. 1 and 2, A A designate parts of the framing of the main engine supporting the cylinders which, with their valve-chests, are inclosed within a casing B. C is the crank-shaft of the said engine provided with two eccentrics $a\ a'$ for the valves of the two cylinders thereof. $b\ b$ are the stems or rods of the said valves each connected by a link $c$ with the rods $d\ d'$ of its respective two eccentrics $a\ a'$.

D is the rock-shaft for shifting the links $c\ c$. This rock-shaft is supported in suitable bearings on the framing A and is furnished with arms $e$, one for each link, each of said arms being connected with its respective link by a rod $f$. Only one of these arms $e$ and rods $f$ is shown in the drawings. (See Fig. 2.)

The valves, the links and the eccentric connections need no particular description beyond saying that they may be the same as in engines in common use having link valve-motions.

The rock-shaft D and its arms $e$ and the connections of the latter may be the same as in engines in common use and are so represented.

E designates the cylinder of the reversing engine to which my invention relates. This cylinder may be secured to any fixed part of the main engine. It is represented as affixed to the condenser F. The piston-rod $k$ of this reversing engine is represented in Fig. 2 as having a cross-head which works on a stationary guide $m$, and the said cross-head is connected by a rod $h$ with an arm $g$ on the rock-shaft D, for the purpose of producing the necessary movements of the said rock-shaft for shifting the links.

The cylinder E is furnished as shown in Figs. 3 and 4, with a valve-chest G in which there are two valves H I, the valve H, which is to be operated from the rock-shaft D of the main engine, being cylindrical or circular and hollow and fitted to a seat of corresponding form in the chest G, and the valve I, which is the one to be operated by the hand of the engineer for letting on and shutting off the steam to and from the cylinder E and for regulating the length of stroke of the piston E' being of the kind known as an oscillating D-valve, and fitted to a circular seat provided for it in the interior of the hollow valve H. The said valves have their spindles H' I' in line with each other, the spindle H' of the valve H working through a stuffing-box $n$ in one side of the valve-chest G and the spindle I' of the valve I working through a stuffing-box $o$ in the opposite side of the valve-chest.

The hollow valve H has provided through its circular parts four ports 1, 2, 3, 4, of which 1 is always in communication with a steam pipe p at the back of the valve-chest and the others 2, 3, 4, are so spaced that 4 may always be in communication with the exhaust port 5 of the valve-chest and with the exhaust pipe q thereunto attached, while 2 and 3 are always in communication respectively with the ports 2* and 3* of the valve-chest which communicate respectively with the upper and lower ends of the cylinder E. The said ports 2*, 3* and 5 are of such width and the oscillating movement to be given to the valve H, as will be hereinafter described, is of such extent that the said ports 2, 3 and 4 will always continue in communication with their respective ports 2*, 3* and 5. The necessary oscillating movement of the said valve H is produced by an arm $i$ on the rock-shaft D of the link motion through a rod $j$ which connects the arm $i$ with the arm $j'$ of the valve spindle H'.

The valve I which is the only one to be operated by the hand of the engineer for controlling the main engine, has the cove in its face and the marginal portions of its face outside of said cove of such width that the said portions may cover and close the ports 2, 3 and 4 as may be understood by reference to Figs. 3 and 6, or that it may bring either of the ports 2 or 3 in communication with the port 4 as may be understood by reference to Fig. 5 where 3 and 4 are in communication. For operating the said valve I, its spindle I' is furnished with an arm $r'$ which is connected by a rod $r$ with one arm of an elbow-lever $s$ working on a fixed fulcrum $s'$, the other arm of the said elbow-lever being connected by a rod $r^2$ with the arm $t'$ of a small rock-shaft $t$ which works in suitable fixed bearings $t^2$. On the end of this rock-shaft at the front of the main engine is a small hand-lever $t^3$ by which the engineer, through the connections of the rock-shaft $t$ just described with the valve I, manipulates the said valve for stopping, starting and reversing the main engine as will be presently described. This hand-lever $t^3$ is fitted with a hand-screw $t^4$ by which it may be secured to a slotted sector plate $t^5$ to hold the valve I in either of the three positions necessary for stopping the engine or causing it to turn forward or backward. In Fig. 1 the lever is shown locked in the central position for stopping.

When the main engine is at rest and the links of the valve gear occupy the central position shown in Fig. 2, the piston E' of the reversing engine is stationary at the center of its stroke as shown in Fig. 3 and the valves H and I are both in their central positions, the ports 2 and 3 in the valve H being covered by the marginal portions of the face of the valve I and closed.

To start the engine all that is necessary is to move the hand-lever $t^3$ in one direction or the other to bring the valve I to a position to admit steam through the ports 2, 2* or 3, 3* to the upper or lower end of the cylinder E and open the other end through the ports 3, 3* or 2, 2* to the exhaust and thereby to produce the movement of the piston E' downward or upward and so cause the said piston, through the rods $k$ and $h$, to turn the rock-shaft D in a direction to shift the links $c$ to positions for running the main engine in a forward or backward direction. I will suppose, for example, the valve I to be turned in the direction of the arrow shown upon it in Fig. 5, to cause steam, which always fills the valve H behind the valve I, to enter through the ports 2 and 2* to the upper end of the cylinder E and to produce the exhaust from the lower end of the cylinder through the port 3, through the cove of the valve I and through the ports 4 and 5. The movement of the piston E' in the downward direction then takes place and the steam by its pressure and expansive force would then drive the piston violently to the bottom of the cylinder, but as soon as the piston begins to move it begins to turn the rock-shaft in the direction of the arrow shown in Fig. 2, and the arm $i$ on said rock-shaft then acts through the rod $j$ to turn the valve H in the same direction in which the valve had been turned by hand, as indicated by the arrow within said valve H in Fig. 5, and thus restricts the passage of the steam through the port 2 and the exhaust through 3. The movement of the valve I by hand may in the meantime be continued so that the admission of steam to and its exhaust from the cylinder may be continued although such admission and exhaust continue to be restricted and are finally stopped by the more rapid or further continued movement of the valve H produced by the engine. The above described operation of the valves continues until the piston E' has moved to the end of its stroke or as far as may be desired, the movement of the piston continuing while the movement of the valve I is continued; and as the movement of the latter is controlled by the engineer while the movement of the link is controlled by the piston E' the engineer has perfect control of the link for he may move the valve I to any intermediate position between its two extreme positions thus admitting the steam to either end of the cylinder E and causing the valve H to be moved by the piston E' into such a position as will shut it off to bring the piston to a stop in a position always corresponding to the position of the valve I.

It will be obvious that by turning the valve I by hand in the opposite direction to that indicated by the arrow shown on it in Fig. 5, the piston would be caused to move in a reverse direction and the position of the link-motion would be reversed.

In the example of my engine shown in Fig. 7 which is intended for operating heavy slide or gate valves in a steam or other pipe, the piston rod $k$ is continued downward through the bottom of the cylinder E to make connection with the valve, which connection may be made in any suitable manner. The engine differs in no other respect from that shown in the other figures hereinabove described. A similar rock-shaft D is employed, the upper end of the piston rod $k$ being connected with a similar arm $g$ and the arm $j'$ of the valve H being connected by a similar rod $j$ with another arm $i$ on the same rock-shaft D.

What I claim as my invention is—

1. The combination with a steam cylinder and piston and a rock-shaft connected with and operated by said piston, of a hollow circular valve having a port 1 through which it receives steam and ports 2 and 4 through which it effects the induction and eduction of steam to and from said cylinder, a hand-operated valve I within the said hollow valve for opening communication to and from the cylinder through said ports 2 and 4, and a connection between said hollow valve and said rock-shaft for producing the closing of said ports 2 and 4, substantially as herein set forth.

2. The combination with a steam engine having two eccentrics and a connecting link for operating its valve, of a rock-shaft and connections for shifting said link, a steam cylinder containing a piston connected with said rock-shaft for operating the same, a hollow circular valve H having a port 1 through which it receives steam and ports 2 and 4 through which it effects the induction and eduction of steam to and from said cylinder, a hand-operated valve I within the said hollow valve for opening communication to and from the cylinder through said ports 2 and 4, and a connection between said hollow valve and said rock-shaft for producing the closing of said ports 2 and 4, substantially as herein set forth.

ALEXANDER MILLER.

Witnesses:
FREDK. HAYNES,
L. M. EGBERT.